Jan. 21, 1941.　　　C. A. CHAYNE　　　2,229,371
FRAME
Filed July 20, 1938
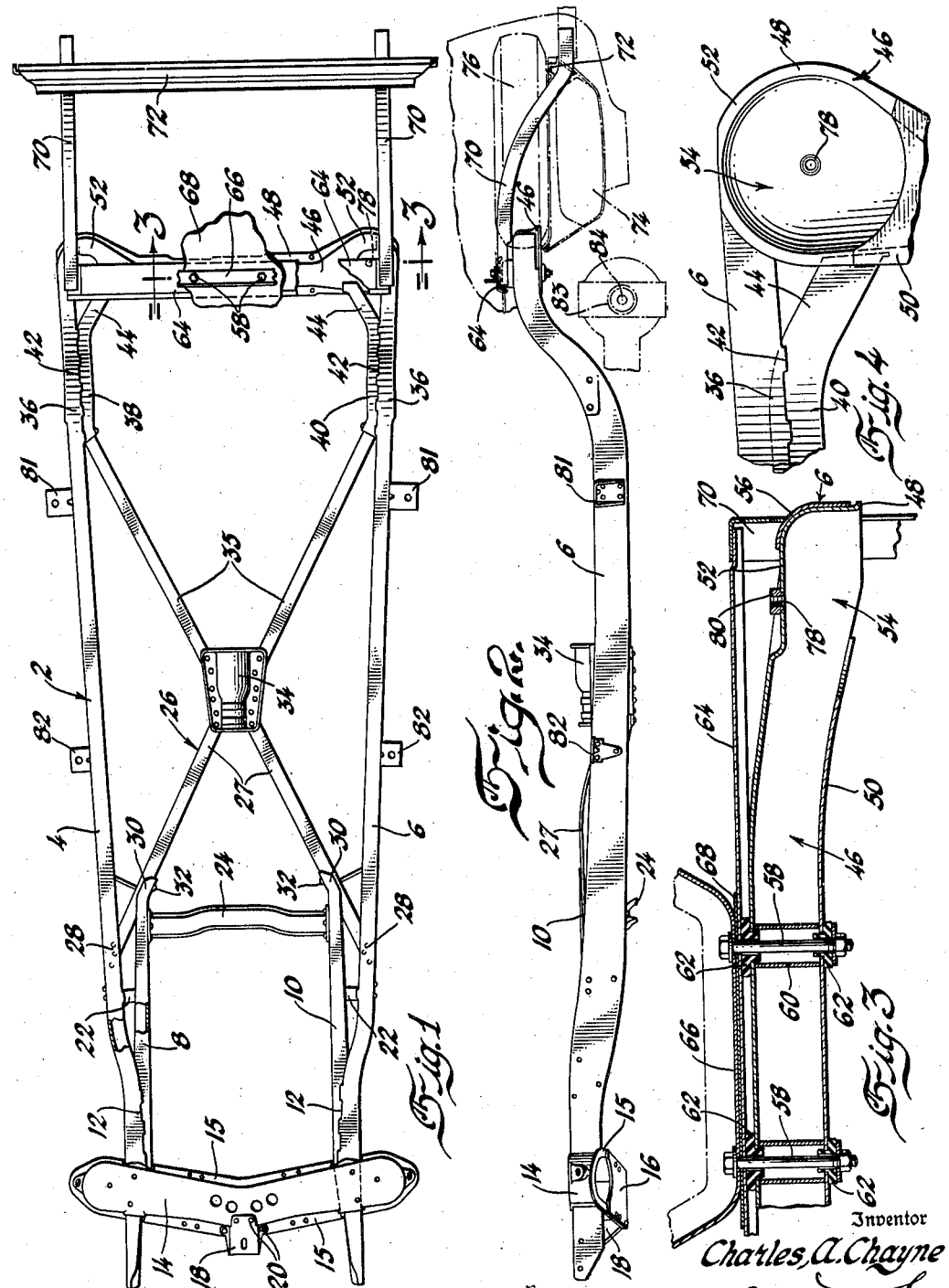
Inventor
Charles A. Chayne
By Blackmore, Spencer & Flint
Attorneys Patented Jan. 21, 1941

2,229,371

UNITED STATES PATENT OFFICE 2,229,371

FRAME

Charles A. Chayne, Flint, Mich., assignor to General Motors Corporation, Detroit, Mich., a corporation of Delaware Application July 20, 1938, Serial No. 220,316

7 Claims. (Cl. 280—106)

This invention relates to frames for use with automotive vehicles.

The principal novelty to the frame resides in the fact that it terminates at the rear axle and has, at its extreme rear end, a transverse member in which there are formed spring seats to receive coil springs for the rear suspension. Beyond the rear axle there is a framework which is a part of the automobile body and which is attached to the rear cross member of the frame to support the spare tire and gasoline tank.

Further novelty of the invention resides in the use of the usual type of X member between the longitudinals of the frame, this X member having continuations at its rear end which continuations are secured to the longitudinals and diverge at the rear ends and are secured to the transverse member having the coil spring seats.

At the front of the frame the front arms of the X member are joined to relatively straight longitudinally extending members, the front parts of which are welded to the frame to form a box section therewith. At its front end the frame passes through a front reinforcing member, which is of inverted U-shape in cross section. This U-shaped front member extends beyond the side bars of the frame and has coil spring seats formed on its ends. The center part of the front reinforcing member has a bracket secured thereto, this bracket being for the purpose of mounting a frame or bracing to support the radiator and front fenders.

On the drawing

Figure 1 is a plan view of the frame with parts broken away at the rear end better to illustrate the construction.

Figure 2 is a side view of the structure of Figure 1 with parts shown in dotted outline to indicate their position in final assembly.

Figure 3 is an enlarged sectional detailed view on the line 3—3 of Figure 1.

Figure 4 is an enlarged bottom view of one of the spring seats in the rear transverse member.

Referring to the drawing, the frame is indicated as a whole at 2. The frame comprises the longitudinals 4 and 6 which are of the shape shown in Figures 1 and 2. At their front ends these longitudinals are reinforced by the relatively straight reinforcing elements 8 and 10. At their front ends these reinforcing elements are welded to the side members 4 and 6 along the lines indicated at 12 and with the side members 4 and 6 form a box section. The members 4, 6, 8, and 10 are channel shaped in cross section and these members have their channels facing each other. The members 8 and 10 terminate at their forward ends where they meet the front transverse cross member 14. This member 14 is of inverted U-shape in cross section, laterally flanged as at 15, and has a plate 16 to close its bottom side. The side bars 4 and 6 of the frame extend through the member 14 as is best shown in Figure 2. The parts are all welded together where they meet.

The member 14 is slightly V-shaped in plan as shown in Figure 1 and at its forward part at the tip of the vehicle a bracket 18 is secured by means of bolts or rivets 20. On this bracket there is mounted the frame which supports the radiator, front fenders, headlamps, etc.

Toward their rear ends the reinforcing members 8 and 10 are spaced from the longitudinals 4 and 6 and suitable reinforcing brackets 22 are positioned between members 4 and 8 and 6 and 10.

A transverse reinforcing bar 24 extends from one bar 8 to the other bar 10 adjacent their rear ends. This bar is secured at its ends to the members 8 and 10 by means of bolts or rivets. In addition to its function of strengthening the frame, the member 24 is arched downwardly and forms a mounting for the rear engine supports.

An X member 26 is secured between the longitudinals 4 and 6 of the frame. The front arms 27 of the X member 26 are welded to the frame at the points indicated at 28. The rear ends of the arms 8 and 10 are secured to the front arms 27 of the X member at the points indicated at 30. These connections at 30 may be either by means of bolts or rivets 32 or by welding. The ends at 30 are slightly bent to form a good fit with the front arms 27 of the X member 26. The X member has the usual central connector 34 to hold the front arms 27 and the rear arms 35 together. This connector 34 may also form a support for the propeller shaft.

The rear arms of the X member extend into the channel of the side bars 4 and 6 and are secured at 36 to the side bars. Reinforcing bars 38 and 40 are secured to the rear arms 35 of the X member 26 and extend parallel with the side bars 4 and 6. The reinforcing bars 38 and 40 are U-shaped in cross section and face the U-shaped cross section of the bars 4 and 6 to form a box section. These parts are welded together along the lines indicated by the numeral 42. The rear ends of the bars 38 and 40 are inwardly bent as indicated at 44 and these rear ends 44 are rigidly united to a transverse rear reinforcing and strengthening member 46. This member 46 extends between the side bars 4 and 6 and is secured thereto but does not extend beyond the side bars of the frame. This is best shown in Figures 1 and 3. The member 46 is of inverted U-shape in cross section and has the lateral flanges 48 and a bottom plate 50 to close the U. The ends of the member 46 are not closed by the plate 50 but are increased in size as indicated at 52 and more or less rounded to form pockets indicated at 54 in Figures 3 and 4. These pockets form seats for coil springs, the lower ends of which are supported from seats secured to the rear axle housing or from torque arms the front ends of which are attached to the rear arms of the X member 26 or to the side bars 4 and 6 of the frame. This latter construction is not shown in the instant application, but is shown and described in my copending applications Serial Nos. 152,056, 183,642, 183,643, or the application of Benjamin H. Anibal, 183,440, now Patents Nos. 2,182,248 of December 5, 1939, 2,159,203 of May 23, 1939, 2,182,249 of December 5, 1939, and 2,207,367 of July 9, 1940, respectively.

Where the longitudinals 4 and 6 meet with the rear transverse member 46 they are curved as indicated at 56 and both parts 4 and 6 are secured together where they meet.

Adjacent the center of the member 46, body securing bolts 58 are applied in the manner shown in Figure 3. Two bolts 58 are shown but one only is used in practice. These bolts pass through tubes 60 positioned between the lower plate 50 and the bottom of the transverse member 46. At the top and the bottom of the openings through which the bolts 58 pass, rubber washers 62 are positioned to avoid a metal to metal contact. These bolts 58 hold in place a plate 64 and a U-shaped bracket 66, both of which are a part of the automobile body. Between the plate 64 and the U-shaped bracket 66 there is positioned a piece of fabric or other sound deadening material 68.

The plate 64 has secured at its ends the rearwardly extending bars 70 which are connected at their ends by the transverse bar 72. The bars 70 and 72 are a part of the automobile body and support the gasoline tank indicated in dotted outline at 74 and also serve as a mounting for the spare tire 76.

Referring to Figures 3 and 4 immediately over the pocket 54 for the coil spring there is provided an opening 78 to which there is rigidly secured the nut 80. The purpose of the nut 80 is to hold a fixture which retains the upper coil of the coil spring and prevents it from moving laterally and downwardly in the pocket 54.

The longitudinals 4 and 6 of the frame have the lateral projecting brackets 81 and 82 for the purpose of mounting the body. If desired, suitable body mountings may also be placed on the plate 64 of the rear of the body.

The rear axle housing is indicated at 83 and has the usual live axle 84 therein. It will be noted that the frame terminates slightly beyond the position of the rear axle. In this respect the frame differs from frames of the conventional type which have their rear ends terminating far to the rear of the rear axle.

I claim:

1. In a vehicle frame, longitudinals extending the length of the frame, said longitudinals terminating substantially over the rear of the axle, a cross member at the rear of the longitudinals, said cross-member being of inverted U-shape in cross section, and coil spring seats formed in the said cross member.

2. In a vehicle frame, longitudinals extending the length of the frame, reinforcing elements between the frame and interconnecting the longitudinals, a cross member at the rear end of the frame and secured to the longitudinals and to the reinforcing elements, said cross member being of inverted U-shape in cross section, and spring seats formed in said cross member.

3. In a vehicle frame, longitudinals extending the length of the frame, an X member between the longitudinals and secured thereto, bars forming a continuation of the X member and secured to the longitudinals, a cross member at the extreme rear end of the frame and secured to the longitudinals and to said bars, and spring seats on the underside of said cross member.

4. In a vehicle frame, longitudinals extending the length of the frame, a transverse cross member at the rear of the frame and secured thereto, said member having widened ends where it joins to the longitudinals, said widened ends having on their undersides seats to receive the springs of the vehicle, said longitudinals having their rear ends shaped to conform to the shape of the widened ends of the transverse member.

5. In a vehicle frame, longitudinals extending the length of the frame, a transverse cross member at the rear of the frame and secured thereto, said member having widened ends where it joins to the longitudinals, said widened ends having on their undersides seats for the springs of the vehicle, said transverse member having a raised center part, and means attached to said center part to form a support for the auxiliaries of the vehicle.

6. In a vehicle frame, said frame comprising longitudinals extending the length of the frame tween and interconnecting the longitudinals at the extreme rear end of the frame, said member having widened ends where it joins to the longitudinals, said widened ends having on their undersides seats to receive the springs of the vehicle.

7. In a vehicle frame, said frame comprising longitudinals extending the length of the frame and a transverse cross member extending between and interconnecting the longitudinals at the extreme rear end of the frame, said members having widened ends where it joins to the longitudinals, said widened ends having on their undersides seats for the springs of the vehicle, said seats being between the longitudinals.

CHARLES A. CHAYNE.

CERTIFICATE OF CORRECTION.

Patent No. 2,229,371. January 21, 1941.

CHARLES A. CHAYNE.

It is hereby certified that error appears in the printed specification of the above numbered patent requiring correction as follows: Page 2, second column, line 48, claim 6, for the syllable "tween" read --and a transverse cross member extending between--; line 57, claim 7, for "members" read --member--; and that the said Letters Patent should be read with this correction therein that the same may conform to the record of the case in the Patent Office.

Signed and sealed this 4th day of March, A. D. 1941.

Henry Van Arsdale,
Acting Commissioner of Patents.

(Seal)